(12) United States Patent
Partusch et al.

(10) Patent No.: US 6,696,160 B2
(45) Date of Patent: Feb. 24, 2004

(54) POLYURETHANE COMPOSITE COMPONENTS AND THEIR USE IN EXTERIOR BODYWORK PARTS

(75) Inventors: Georg Partusch, Pürgen (DE); Michael Bauer, Munich (DE); Michael Fader, Olching (DE); Jörg Pöltl, Dachau (DE); Markus Templin, Lemförde (DE); Ralf Fritz, Greifenberg (DE); Jürgen Schneider, Ludwigshafen (DE); Astrid Weidemann, Überacker (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 114 days.

(21) Appl. No.: 10/120,119

(22) Filed: Apr. 10, 2002

(65) Prior Publication Data
US 2002/0160204 A1 Oct. 31, 2002

(30) Foreign Application Priority Data

Apr. 27, 2001 (DE) .......................... 101 20 912

(51) Int. Cl.$^7$ ............................................. B32B 27/40
(52) U.S. Cl. ..................... 428/423.3; 428/114; 256/255
(58) Field of Search ............................... 428/423.3, 114; 256/255

(56) References Cited

U.S. PATENT DOCUMENTS 6,096,416 A * 8/2000 Altenberg ................ 428/317.7

FOREIGN PATENT DOCUMENTS

| DE | 19732425 | 2/1999 |
|----|----------|--------|
| DE | 19808026 | 9/1999 |
| EP | 0995667 | 4/2000 |
| WO | WO 98/29233 | 7/1998 |

OTHER PUBLICATIONS

Chem Abstract of EP 0995667A1.
Chem Abstract of DE 19732425A1.
Chem Abstract of DE 19808026A1.

* cited by examiner

Primary Examiner—James J. Seidieck
Assistant Examiner—Melanie Bissett
(74) Attorney, Agent, or Firm—Fernando A. Borrego

(57) ABSTRACT

The invention provides composite components constructed of a layer i) comprising short fiber reinforced PU and having a paintable surface, and a layer ii) comprising long fiber reinforced polyurethane, and also provides a process for producing them, and provides for their use as exterior bodywork parts.

8 Claims, No Drawings

POLYURETHANE COMPOSITE COMPONENTS AND THEIR USE IN EXTERIOR BODYWORK PARTS

The invention relates to composite components constructed of a layer i) having a paintable surface and comprising short fiber reinforced polyurethane and a layer ii) comprising long fiber reinforced polyurethane and to a process for producing them and to their use as exterior bodywork parts.

Composite components made of polyurethane (PU below) are diverse materials whose applications include use as exterior bodywork parts on account of the fact that, as compared with the conventional, metal components, they possess, for example, a lower weight. Stringent requirements are imposed on these components, however, with respect for example to their stiffness and visual surface qualities.

EP-A-995 667, WO 98/29233 and DE-A-197 32 425 describe the production of composite components constructed of a thermoplastic film which is foam backed with long glass fiber reinforced polyurethane. To produce colored components, a pigmented film is used. At present, however, it is not possible to produce these composite components with surface qualities which correspond to those of a high-quality paint finish (class A surface) or which make online painting possible, in particular. (Normal painting of the PFM film is unproblematic, but the aim when using PFM is to achieve an A class surface, including color matching to the rest of the vehicle, without painting.)

DE-A-198 08 026 describes components made of polyurethane (PU) for the exterior automotive sector: in a first workstep, a fiber reinforced, rigid PU foam core is produced and in a second workstep this core is overcast with a compact PU coating so as to give the basis for the class A surface which is produced by subsequent painting. These components are used, for example, as hardtops for cabriolets. A disadvantage with this process is the relatively high reject rate which arises owing to defects when applying the compact coating. Refinishing the defects is impossible owing to incompatibility of the repair sites (shrinkage of the refinish compound). A further disadvantage of the disclosed process is that the coating must be highly elastic and therefore soft in order to compensate the differences in expansion between core and coating when the temperature fluctuates. If it did not do so, a fine texture would become visible in the surface as soon as the parts cooled after demolding, and this texture would become more pronounced after painting, normally at 80–100° C. Online painting, normally 1 h at 180° C., is not possible owing to the low glass transition point of the elastic coating. A soft surface, however, harbors numerous disadvantages—for example, it is very sensitive to scratching.

It is an object of the present invention to provide composite components made of polyurethane for use as exterior bodywork parts from which the above-indicated disadvantages are absent. Accordingly, the invention intends to provide composite components which combine good mechanical properties such as high stiffness and heat distortion resistance, for example, with a surface which is not only paintable, preferably online, so that a class A surface may be obtained after painting, but which also has the required hardness in order to minimize greatly its sensitivity to scratching. A further object of the invention is to provide a process for producing said composite components that has technical and economic advantages.

We have found that these objects are achieved by a composite component comprising a layer of short fiber reinforced PU with a paintable surface, as the coating, and a layer of long fiber reinforced PU, as the support, and by a process for producing said composites by introducing first the coating and then the support into a mold.

The invention accordingly provides a composite component constructed of a layer i) having a paintable surface and comprising short fiber reinforced PU and a layer ii) comprising long fiber reinforced polyurethane.

The invention further provides a process for producing composite components constructed of a layer i) having a paintable surface and comprising short fiber reinforced PU and a layer ii) comprising long fiber reinforced PU, comprising the following steps:

A) introducing layer i) into a mold, with the paintable surface facing the mold wall, and then
B) applying layer ii) to layer i) by the LFI technique, and demolding the component.

The invention lastly provides for the use of the composite components of the invention to produce exterior bodywork parts.

The composite components of the invention comprise two layers. Layer i) of the composite component of the invention comprises short glass fiber reinforced polyurethane having a paintable surface, and serves as a coating, which covers at least one side of layer ii), comprising a long fiber reinforced polyurethane that functions as a strengthening support.

A paintable surface in the context of this invention is a surface whose qualities are such that it constitutes a high-grade optical surface after painting. There must accordingly be no visible defects, depressions and/or unevennesses, such as waviness. By paintable is meant preferably that, after painting, a class A surface can be obtained.

A class A surface is a surface which appears to be of high optical quality when viewed. In assessing the height of the quality, account may be taken of coarse and fine textures, defects and/or gloss.

A class A surface preferably has little coarse texturing, i.e., there are very few extruder marks, for example, and the surface has a very high distinctness of image (DOI). A class A surface should also have very little fine texturing, i.e., there should be very little perceptible fine texturing of the type known in the art as orange peel.

Additionally, a class A surface has very few defects. By defects are meant, for example, bubbles, inclusions, and scratches, and a distinction may be made between large and small defects. Small bubbles and inclusions have a diameter of from 0.2 to 0.5 mm, large bubbles and inclusions a diameter of from 0.5 to 1 mm. Small scratches have a depth of not more than 0.03 mm and a length of not more than 0.1 mm, large scratches a depth of not more than 0.03 mm and a length of not more than 6 mm. In one preferred embodiment of a class A surface, the minimum distance between two large defects is 150 mm and/or there are not more than 2 small defects in a radius of 150 mm around a large defect and/or there are not more than 4 small defects within a radius of 150 mm around a small defect.

A class A surface ought to have a very high gloss. In one preferred embodiment the surface has a gloss of 80 units (GU) at a viewing angle of 20°, measured in accordance with DIN 67530.

The quality of being paintable also means that the surface has qualities which allow online painting to be carried out. For this it is necessary for the composite component, and in particular the surface of the layer i), to have a dimensional stability under heating of at least 1 hour at up to 180° C., where appropriate at up to 200° C.

Online painting embraces the mounting of the exterior bodywork parts onto the so-called body in white (metal body), which then traverses the following process steps: cleaning—phosphating—electrocoating with baking (170°–210° C.)—underbody protection (110–150° C.)—surfacer coat, hard (130–160° C.)—basecoat/clearcoat, hard (130–140° C.)—quality control—final assembly. With inline painting, the separately primed component is mounted onto the body before the basecoat is applied. With offline painting the fully painted component is brought to the line for final assembly. The highest thermal load occurs during the baking of the electrocoat. The moldings must not undergo significant dimensional change nor significant changes in material properties.

Layer i), which has a paintable surface, ought also to be of a quality such that it is very largely insensitive to external mechanical influences such as impacts and scratches, for example. Accordingly, layer i) has a hardness of preferably 50 Shore D, more preferably 60 Shore D, with particular preference 65–70 Shore D.

The polyurethane used in layer i) is short fiber reinforced. Short fiber reinforced polyurethane is PU containing reinforcing fibers whose nature is such that they can be processed using a conventional high pressure mixing head. In general, the fibers have an average length of less than 500 mm, preferably less than 250 mm, in particular less than 160 mm.

For the purposes of the present invention, short fiber reinforced polyurethane includes platelet reinforced polyurethane or PU reinforced with a mixture of fibers and platelets. The dimensions of the platelet-shaped fillers are subject to similar specifications as those described above for the fibers.

The short fibers used may be glass fibers, mineral fibers, natural fibers, such as those of flax, jute or sisal, and/or synthetic fibers, such as polyamide fibers, polyester fibers, carbon fibers or polyurethane fibers. The platelet-shaped fillers used may comprise glass flakes or minerals such as mica. As short fibers use may also be made, where appropriate, of fillers which have the abovementioned dimensions and can be processed using a high pressure mixing head. Preference is given to using glass fibers or mineral fibers.

All fillers are generally unsized or sized, i.e., surface modified, in order to improve their free-flow properties or in order to increase their adhesion to the PU matrix.

The short fibers/platelets or mixtures thereof are normally used in an amount from 0.1 to 50% by weight, preferably from 1 to 25% by weight, more preferably from 3 to 20% by weight, and with particular preference from 5 to 22% by weight, based on the overall weight of layer i).

Layer i) of the composite components of the invention normally has a density of from 0.8 to 1.5 kg/l, preferably from 0.9 to 1.3 kg/l. To achieve this density it is preferred to use compact or microcellular polyurethanes. Compact polyurethanes are preferred.

The thickness of layer i) in the composite components of the invention is usually from 0.1 to 15 mm, preferably from 0.5 to 5 mm, more preferably from 0.5 to 2.5 mm.

In order to ensure paintability of the layer i) at different temperatures, it is desirable for the thermal expansion to be low. In one preferred embodiment layer i) has a linear expansion coefficient of from 0.1 to 65, preferably from 1 to 50, with particular preference from 10 to 45.

By linear expansion is meant the change in length, dL, experienced by a solid body, i.e., layer i) here, for a change in temperature dT. It is described in first approximation by $dL/L = a \cdot dT$, the linear expansion coefficient a being reported in the order of magnitude $10^{-6}/K$.

Layer ii) of the composite components of the invention comprises long fiber reinforced polyurethane and serves as the support which gives the component advantageous mechanical properties, such as high strength.

Long fiber reinforced polyurethane is PU containing reinforcing fibers whose nature is such that they cannot be processed using a conventional high pressure mixing head. The long fibers may be introduced into the polyurethane by means, for example, of the prior art LFI (long fiber injection) technique, and generally have a length of more than 5 mm, preferably of more than 10 mm, with particular preference from 10 mm to 10 cm. Where appropriate it is also possible to introduce the long fibers in the form of mats into the polyurethane.

The long fibers used may comprise glass fibers, natural fibers, such as those of flax, jute or sisal, synthetic fibers, such as polyamide fibers, polyester fibers, carbon fibers or polyurethane fibers.

The long fibers are normally used in an amount of from 0.1 to 90% by weight, preferably from 1 to 50% by weight, more preferably from 5 to 40% by weight, and with particular preference from 10 to 30% by weight, based on the overall weight of layer ii).

Layer ii) of the composite components of the invention normally has a density of from 0.1 to 1.3 kg/l, preferably from 0.2 to 1.1 kg/l, with particular preference from 0.3 to 1.0 kg/l. To achieve this density, use is made of compact or cellular polyurethanes, rigid polyurethane foams being preferred for use.

The thickness of layer ii) in the composite components of the invention is normally from 0.1 to 250 mm, preferably from 0.5 to 100 mm, more preferably from 1 to 50 mm, with particular preference from 1 to 10 mm.

In one preferred embodiment layer i) has a linear expansion coefficient of from 0.1 to 65, preferably from 1 to 50, with particular preference from 20 to 45, the expansion coefficient a being as defined above.

In the composite components of the invention there is preferentially adhesion between layer i) and layer ii); in other words, the adhesion between the layers is preferably greater than the cohesion within a layer.

The composite components of the invention generally have a heat distortion resistance up to 180° C., preferably up to 200° C. To ensure this heat distortion resistance it is advantageous to tailor the expansion coefficients of the layers i) and ii) to one another. In one preferred embodiment the difference between the thermal expansion coefficients of layers i) and ii) is from 0 to 30, preferably from 1 to 20.

Further, the composites of the invention preferably have a tensile strength to DIN EN 61 of from 10 to 21 $N/mm^2$, a modulus of elasticity under tension to DIN EN 61 of from 1200 to 4000, with particular preference from 1500 to 3600, $N/mm^2$, an impact strength to DIN 53453 of from 14 to 90 $kJ/m^2$ (or no fracture of the specimens at room temperature), a modulus of elasticity under flexure to DIN EN 63 of from 1400 to 4000 $N/mm^2$ and/or a flexural strength to DIN EN 63 of from 30 to 90 $N/mm^2$.

With the composites of the invention there should be no warping when temperatures change. It is therefore preferred for the composites to have a linear expansion coefficient of less than 50, preferably from 5 to 30, in all directions (x, y and z).

The composites of the invention comprise polyurethanes. Polyurethanes here are polyisocyanate polyadducts obtainable by reacting a) polyisocyanates with b) isocyanate-reactive compounds in the presence or absence of c) blowing agent, d) catalysts, and e) auxiliaries and additives.

As isocyanates (a) it is possible to use the (cyclo)aliphatic and/or, in particular, aromatic polyisocyanates which are general knowledge. Particularly suitable isocyanates for preparing the composites of the invention are aromatic diisocyanates, preferably diphenylmethane diisocyanate (MDI) and tolylene diisocyanate (TDI). The isocyanates may be used in the form of the straight compound or in modified form; for example, in the form of uretdiones, isocyanurates, allophanates or biurets, preferably in the form of reaction products known as isocyanate prepolymers, which contain urethane and isocyanate groups.

Suitable isocyanate-reactive compounds (b) include compounds whose molecule carries two or more reactive groups selected from OH, SH, NH, $NH_2$ and CH-acidic groups, such as β-diketo groups. It is appropriate to use those having a functionality of from 1.8 to 8, preferably from 2 to 6, and a molecular weight of from 300 to 8000, preferably from 400 to 4000. Examples of compounds which have proven suitable include polyether-polyamines and/or preferably polyols selected from the group of polyether polyols, polyester polyols, polythioether polyols, polyesteramides, hydroxyl-containing polyacetals, and hydroxyl-containing aliphatic polycarbonates, or mixtures of at least two said polyols. Polyester polyols and/or polyether polyols find preferred application. Particular preference is given to using polyether polyols containing at least 10% primary hydroxyl groups. As a general rule, the hydroxyl number of the polyhydroxy compounds is from 50 to 1000. Additionally, the compounds (b) may be used as a mixture with customary chain extenders and/or crosslinking agents.

Blowing agents (c) which can be used are compounds with a chemical or physical action which are commonly known to produce foamed products. As a chemically acting blowing agent it is possible with preference to use water. Examples of physical blowing agents are inert (cyclo) aliphatic hydrocarbons having from 4 to 8 carbon atoms, which evaporate under the conditions of polyurethane formation. The amount of blowing agents used is guided by the target density of the foams.

As catalysts (d) it is possible to use customary compounds which accelerate the reaction of component (a) with component (b). Suitable examples include tertiary amines and/or organometallic compounds. Examples of compounds which may be used as catalysts include the following: triethylenediamine, aminoalkyl- and/or aminophenyl-imidazoles, e.g. 4-chloro-2,5-dimethyl-1-(N-methylaminoethyl)imidazole, 2-aminopropyl-4,5-dimethoxy-1-methylimidazole, 1-aminopropyl-2,4,5-tributylimidazole, 1-aminoethyl-4-hexylimidazole, 1-aminobutyl-2,5-dimethylimidazole, 1-(3-aminopropyl)-2-ethyl-4-methylimidazole, 1-(3-aminopropyl)imidazole and/or 1-(3-aminopropyl)-2-methylimidazole, tin(II) salts of organic carboxylic acids, examples being tin(II) diacetate, tin(II) dioctoate, tin(II) diethylhexoate, and tin(II) dilaurate, and dialkyltin(IV) salts of organic carboxylic acids, examples being dibutyltin diacetate, dibutyltin dilaurate, dibutyltin maleate and dioctyltin diacetate.

The reaction takes place if desired in the presence of (e) auxiliaries and/or additives, such as cell regulators, release agents, pigments, surface-active compounds and/or stabilizers to counter oxidative, thermal or microbial degradation or aging.

The composite components of the invention are produced preferably by the following process.

In a first step, A), layer i) of the composite component is introduced into a mold by the known RIM (reaction injection molding) technique. The surface which constitutes the paintable surface of the subsequent composite component is facing the mold wall.

After the curing of layer i), in a second step, B), layer ii) is applied to layer i) by the known LFI technique, i.e., the coating (layer i) in the mold is given a backing of long fiber reinforced PU foam. A brief description of the LFI technique can be found, for example, in EP-A-995 667. Following the curing of layer ii), the composite component is demolded.

In one preferred embodiment, steps A) and B) take place in the same mold, with the lid of the mold being changed after step A) in order that layer ii) can be introduced into the same mold.

In order to increase the adhesion between layers i) and ii), layer i) may be pretreated before being foam backed. Pretreatment may be accomplished, for example, by application of a primer, by flame treatment or mechanical roughening or exposure to light (radiation with a wavelength less than 800 nm) or to particles (sandblasting). This pretreatment, however, is optional.

In one preferred embodiment, the process comprises a further step, C), wherein the demolded component is painted. Painting takes place preferably in the form of an online process, since this has technical and economic advantages. In one particularly preferred form, the composite component obtained in step C) has a class A surface.

For producing the products of the invention, the isocyanates (a) and the isocyanate-reactive compounds (b) may be reacted in amounts such that the equivalents ratio of NCO groups of (a) to the sum of the reactive hydrogen atoms of (b) is preferably from 0.90 to 1.5:1, with particular preference from 1 to 1.2:1.

The products are normally produced by the known one-shot technique or by the likewise known prepolymer technique.

The RIM technique of reacting the reaction mixture may be conducted in customary open or closable molds which are preferably temperature controllable. Particularly for the production of extremely smooth products it is preferred to use those molding tools whose surface is very smooth or carries defined ornamentation but has preferably no unevennesses, cracks, scratches or impurities. The surface of this mold may be treated, for example, by polishing.

Molds which may be used to produce the products include customary and commercially available molds with surfaces of, for example, steel, aluminum, enamel, Teflon, epoxy resin, or other polymer material. Said surfaces may have been chromium plated, by hard chroming, for example. The molds should preferably be temperature controllable in order to be able to set and adjust the preferred temperatures; they should be closable, and should preferably be equipped such that pressure may be exerted on the product.

The reaction to the polyisocyanate polyadducts takes place normally at a mold temperature of from 30 to 80° C. and a reactant temperature of preferably from 18 to 65° C. for a period of normally from 0.5 to 10 min, preferably from 0.5 to 5 min.

In accordance with their preferred use as flat moldings, as substitutes for metal panels, for example, the composite components of the invention preferably have a flat structure. The products possess a thickness of from 1 to 500 mm, preferably from 5 to 50 mm.

The composite components of the invention find preferred application as components in automotive, aerospace or real estate construction, more preferably as bodywork components for motor vehicles, and particularly as roofs, doors, hoods, trunk lids, spoilers, bumpers, and hardtops.

The composite components of the invention have the advantage that they meet the requirement for good mechanical properties such as tensile strength, impact strength, and flexural strength in unison with the requirement for a paintable surface.

The process claimed in this invention for producing these composite components is notable for its high level of economy. In comparison with the process known from DE-A-198 08 026, significantly fewer defects are formed during the production of layer i), these defects being liable to arise in the prior art process owing, for example, to air bubbles which have not escaped completely from the mold. Even if defects were to occur in the production of layer i), the losses in the present process would be less than those with the process disclosed in DE-A-198 08 026, since in that process it would then be necessary to discard not only layer i) but also layer ii).

The present invention is illustrated by the following example.

EXAMPLE

Described is a process for producing glass fiber reinforced specimen plates which, by means of a top layer (=layer i)) comprising filler reinforced (=short fiber reinforced), compact PU, receive a class A surface such as is required by numerous automakers for exterior components.

Step 1. Manufacture of the Top Layer from Compact, Mineral Filled Polyurethane (PU)

Flanged firmly onto a specimen plate mold (material: steel, dimensions: 500×400×2 mm (length×width×height) via a fan gate is a mixing head for mixing PU components in a one shot process. The specimen plate mold is thermostated at 60° C. by means of a hot water heating system. The surface of the mold is polished. The liquid PU components (material name: Elastolit® K 4900/1/LT/CN) A (polyol mixture+additives) and B (isocyanate) are mixed in the mixing head with the aid of a high pressure metering unit (company designation: Puromat® SV 20), and injected into the closed mold via the fan gate (RRIM process), a crosslinking reaction of A and B taking place in the mold to form solid, unfoamed (compact) PU. After 5 minutes, the top layer is demolded.

The specimen plate has a density of 1 150 kg/m$^3$. Since a filler (designation: muscovite mica, W160) is additionally present in the A component, the top layer possesses the following mechanical properties:

flexural strength: 80 N/mm$^2$,
flexural elasticity modulus: 3 450 N/mm$^2$.

This platelet-shaped filler also gives the cured PU unidirectional shrinkage and heat expansion properties. Since the curing PU takes on the image of the polished mold surface directly, the surface of the top layers possesses what is called class A compatibility, and can be painted without pretreatment, with the high heat distortion resistance (HDT/B: 105° C.) constituting a further advantage.

As a result of the use of internal release agents, the surface of the mold is coated by spraying with release wax only at the beginning (demoldings 1 to 5). After each subsequent demolding, the mold surface must be polished in order to facilitate the process of release without external release agents.

Step 2. Reinforcement of the Top Layer with Glass Fibers and Cellular PU Foam

In order to raise the mechanical strength of the top layer, in a second operation it is reinforced by means of the so-called LFI® process (Kraus-Maffei) (=layer ii), long fiber reinforced polyurethane). First of all, the top layer from step 1 is cleaned to remove any dust or dirt particles and is placed in the cavity of the specimen plate mold (material: aluminum, dimensions: 1 000×500×8 mm; thermostated at 55° C. in its top part by a warm water heating system and thermostated at 35° C. in its bottom). The PU/glass fiber mixture (cut glass fibers: length: 25 mm, wetted with liquid PU reaction mixture; company name of the PU: Elastoflex® E 3509) is then applied to this top layer in the open mold by means of a unit developed for this process (LFI-PUR®, Krauss Maffei GmbH). Subsequent closing of the mold and foaming of the cellular PU mixture produces a 6 mm thick, glass fiber reinforced PU foam-layer on the abovementioned top layer, the cellular structure of said foam layer giving a density of 600 kg/m$^3$. After 200 seconds the composite component (top layer i)+reinforcing layer ii)) is demolded. As a result of the glass fiber fraction (10%) in the reinforcing layer, the composite component as a whole has the following mechanical properties:

flexural strength: 65 N/mm$^2$
flexural elasticity modulus: 2 650 N/mm$^2$
density of the composite component: 880 kg/m$^3$.

The surface of the demolded component can be sealed without pretreatment, using customary commercial coating materials.

We claim:

1. A composite component comprising a layer i) having a paintable surface and comprising short fiber reinforced polyurethane and a layer ii) comprising long fiber reinforced polyurethane.

2. A component as claimed in claim 1, having a linear expansion coefficient of not more than 50.

3. A component as claimed in claim 1, wherein the difference between the linear expansion coefficients of layer i) and ii) is not more than 30.

4. A component as claimed in claim 1, wherein layer i) has a hardness of at least 50 Shore D.

5. A component as claimed in claim 1, wherein the paintable surface of the layer i) is painted and has a class A surface.

6. A process for producing a composite component constructed of a layer i) having a paintable surface and comprising short fiber reinforced polyurethane and a layer ii) comprising long fiber reinforced polyurethane, comprising the following steps:

A) introducing layer i) into a mold having a mold wall, with the paintable surface facing the mold wall, and then B) applying layer ii) to layer i) by a LFI technique, and C) demolding the component.

7. A process as claimed in claim 6, further comprising the step D) of painting the layer i).

8. A process as claimed in claim 7, wherein said painting produces a class A surface.

* * * * *